United States Patent [19]
Naeini et al.

[11] Patent Number: 5,233,643
[45] Date of Patent: Aug. 3, 1993

[54] METHOD AND SYSTEM NETWORK FOR PROVIDING AN AREA WITH LIMITED BANDWIDTH BI-DIRECTION BURST PERSONNEL TELECOMMUNICATIONS

[75] Inventors: Abdolreza S. Naeini, Dallas; Rajendra Patel, Plano; Marion K. Vaughn, Jr., Dallas, all of Tex.

[73] Assignee: Network Access Corporation, Richardson, Tex.

[21] Appl. No.: 773,368

[22] Filed: Oct. 8, 1991

[51] Int. Cl.$^5$ ............................................. H04J 3/10
[52] U.S. Cl. ................................... 379/59; 379/58; 455/33.1; 455/33.4; 455/34.1; 370/79; 370/95.1
[58] Field of Search ................... 370/29, 95.1; 379/58, 379/59; 455/33.1, 34.1, 33.4

[56] References Cited

U.S. PATENT DOCUMENTS

| | | | |
|---|---|---|---|
| 4,384,362 | 5/1983 | Leland | 455/33.1 |
| 4,414,661 | 11/1983 | Karlstrom | 370/95.1 |
| 4,638,479 | 1/1987 | Alexis | 370/95.1 |
| 4,811,421 | 3/1989 | Havel et al. | 379/58 X |
| 5,117,423 | 5/1992 | Shepherd et al. | 370/95.1 |

*Primary Examiner*—Douglas W. Olms
*Assistant Examiner*—Russell W. Blum
*Attorney, Agent, or Firm*—Harold E. Meier

[57] ABSTRACT

A unique combination of frequency and time division multiplexed communications is presented to enable bi-directional burst communications between a substantial number of users over a single radio frequency communications channel. A service area for communications is divided into a number of cells, with the cells arranged into clusters. Cells in each cluster are similarly numbered with no two adjacent cells across the service area having the same number. The clusters are also numbered in the same manner. A cellular time division multiplexed waveform is used by the network to carry communications with each cell number and cluster number assigned a time slot. During the time slot corresponding to the cell or cluster number, all cells or clusters having that number will be simultaneously transmitting. This networking technique enables time slots to be reused across the service area.

22 Claims, 13 Drawing Sheets

□ cell transceiver (220)
🗏 cluster transceiver (222)
🗏 group cluster transceiver (224)

METHOD AND SYSTEM NETWORK FOR PROVIDING AN AREA WITH LIMITED BANDWIDTH BI-DIRECTION BURST PERSONNEL TELECOMMUNICATIONS

TECHNICAL FIELD

The present invention relates to personal telecommunications, and in particular to a method and system network for providing bi-directional burst personal telecommunications services to a plurality of subscribers scattered throughout a service area utilizing a unique cellular time division multiplexed communications architecture.

BACKGROUND OF THE INVENTION

Personal communications most often take the form of one of two types of traffic, "continuous" traffic and "burst" traffic. Continuous traffic refers to lengthy communications message transmissions and burst traffic refers to short (communications burst) message transmissions. Both uni-directional and bi-directional continuous message traffic communications systems are known in the art.

The long message nature of continuous message traffic necessitates the establishment of multiple and separate bi-directional communications channels between users and uni-directional channels to decrease or eliminate instances of signal interference or confusion between communications. These channels are either wireline channels to fixed locations or radio frequency channels to service location areas. The short message nature of burst communications is well suited to single channel communications systems. A single radio frequency channel can be used to efficiently handle uni-directional burst communications for a plurality of subscribers as such communications transmissions are unlikely to, or can be controlled not to occur at the same time (otherwise, transmission signal interference would result).

Bi-directional burst communications, on the other hand, have been historically too complex to implement over a single radio frequency channel due to the difficulty in controlling overall system communications timing between a plurality of system subscribers where the timing of both signal transmissions and signal responses between all subscribers tend to be too small and too critical to handle the required capacity in a practical and cost effective fashion. Thus, bi-directional communications must be accurately controlled to avoid simultaneous transmission and signal interference and confusion on the channel. Until now, communications technology and system architecture has been unsuccessful in solving the timing problems presented by single channel bi-directional burst communications between a plurality of subscribers.

Bi-directional burst traffic networks, if available, could be advantageously used to enhance the operational capabilities of both burst and continuous traffic systems, such as paging, cellular telephonic and wireline telephonic systems, to provide a comprehensive personal communications system. Bi-directional burst traffic can be used as an out-of-band signal to locate subscribers and provide notice of in-band personal communications in a manner similar to a paging service. Out-of-band burst communications of a command, control and management nature are useful for controlling in-band continuous telephonic communications as such out-of-band burst communications signals are accessible independent of location. One such system for using bi-directional burst type traffic is disclosed in commonly assigned, co-pending U.S. application for patent Ser. No. 07/723,169.

The issue raised by a bi-directional burst communications system as described above is how are the bi-directional communications going to be managed and carried over a single radio frequency channel. As mentioned above, current communications technology does not permit bi-directional multiple subscriber bursts over a single channel due to signal interference and confusion concerns. Time division multiplexing of the communications over the single channel (similar to wireline telephonic communications) is an alternative solution; however, each subscriber would require their own time slot for communications. This is an impractical solution when communication is desired over a wide service area with a substantial number of subscribers. As the number of time slots in a time division multiplexed system increases to handle additional subscribers, proportional changes in the width of the slot or length of the time cycle occur which limit the amount of information that can be communicated.

A continuous bi-directional communications system addresses the signal interference and confusion problem of a single channel communications network by using assigned frequencies (multiple channels) to carry conversation within limited geographic areas. However, such a configuration consumes a significant portion of the communications spectrum, even with frequency channel reutilization, and is an inefficient means for carrying short bi-directional burst transmissions. Moreover, an equivalent wide spectrum for bi-directional burst communications is not currently available and is unlikely to be provided by the Federal Communications Commission through frequency assignment or reallocation.

For the practical, administrative and technological reasons described above, individual frequency channel assignment (frequency multiplexing as with cellular continuous communications) and individual time slot assignment (time division multiplexing as with wireline continuous communications) are not available solutions addressing the timing concerns of, and the need for bi-directional burst communications. Accordingly, there is a need for a method and system network for enabling bi-directional burst communications to occur over a single radio frequency channel having a limited bandwidth.

SUMMARY OF THE INVENTION

The present invention addresses the need for bi-directional burst communications by providing a method and system network for utilizing a single radio frequency channel having a limited bandwidth to carry bi-directional burst communications of a substantially large number of subscribers with minimal, or no signal interference or confusion. In accordance with the broader aspects of the invention, known cellular frequency multiplexing and wireline time division multiplexing techniques are uniquely combined in a communications method and network to provide for bi-directional burst communications over a single time division managed communications channel.

To establish the necessary communications network, the service area where bi-directional burst communications are desired is divided into a plurality of communications cells (similar to the cells used for continuous telephonic cellular communications), each cell having a cell transceiver for communicating with portable transceivers carried by subscribers located in its cell area. The plurality of cells are grouped into clusters, each cluster having a cluster transceiver for communicating with each cell transceiver located in its cluster area. Finally, the clusters are arranged into a cluster group having a cluster group transceiver communicating with each cluster transceiver located in its group area. The cells within each cluster are numbered in a similar manner such that no two adjacent cells across the service area are assigned the same cell identification number. Similarly, each cluster is numbered such that no two adjacent clusters across the area are assigned the same cluster identification number.

The portable subscriber transceivers, cell transceivers, cluster transceivers and cluster group transceivers all communicate over the same radio frequency communications channel within a limited frequency bandwidth. To control and manage communications and prevent signal interference on the single channel, a unique cellular time division multiplexed network scheme is implemented. The identification numbers for the cells and clusters correspond to a time slot location in each communications cycle of the cellular time division multiplexed waveform carried over the single channel. Communications between cell transceivers, their associated cluster transceiver and users in the cell area occur only during the assigned cell time slot. Similarly, communications between cluster transceivers and their associated group transceiver in the cluster area occur during the assigned cluster time slot. During the time slot assigned to a particular cell or cluster number, all cells and clusters assigned to that number will be simultaneously transmitting over the same channel. With such a cellular time division multiplexing scheme, time slots on a single channel are reused by the cells and clusters across the group (or multiple groups defining the area).

Numbering of the cells and clusters serves not only to identify the physical and time slot location of cells and clusters, but also to physically separate similarly numbered cells and clusters thereby diminishing the likelihood that simultaneous signal transmissions from similarly numbered cell and cluster transceivers will interfere with each other. The power of the radio frequency transmissions from cell and cluster transceivers is regulated and controlled to limit the propagation radius of the transmission signal so as to not interfere with the other physically separated, but similarly numbered and simultaneously transmitting cells and clusters. Thus, bi-directional burst communications are efficiently and effectively carried without need for separately assigned frequency channels (multi-channel frequency multiplexing). Furthermore, reuse of time slots using the cellular time division multiplexed network scheme obviates the need to provide a separate time slot for each user (single channel time division multiplexing).

BRIEF DESCRIPTION OF THE DRAWINGS

A more complete understanding of the cellular time division multiplexing method and system of the present invention may be had by reference to the following Detailed Description when taken in conjunction with the accompanying Drawings, wherein.

DETAILED DESCRIPTION OF THE DRAWINGS

Figure 1:
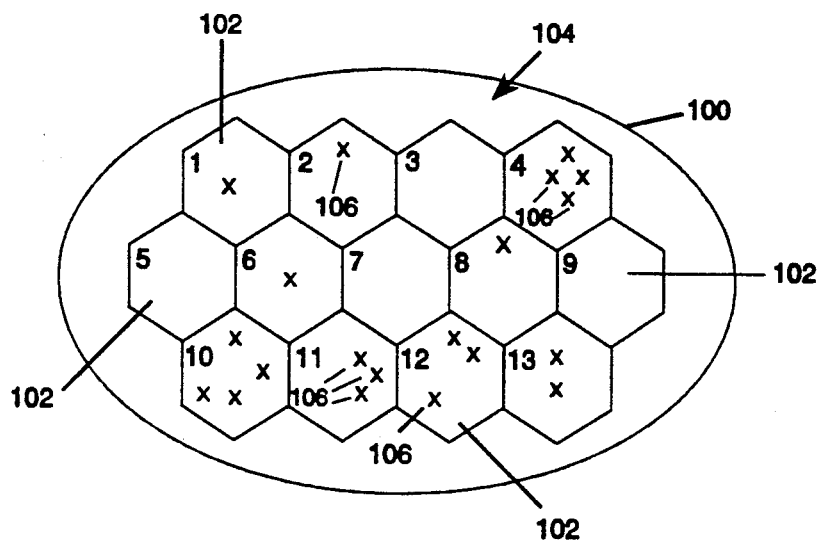
FIG. 1 shows a communications area divided into a number of individual cells for bi-directional continuous communications.

Reference is now made to FIG. 1 wherein there is shown an area 100 schematically subdivided into a number of individual cells 102 as represented by the honeycomb structure 104. Such a "cellular" division of an area 100 has historically been used by cellular communications systems utilizing a "frequency multiplexed" network architecture for multi-channel bi-directional continuous communications with subscribers 106 (represented by an "x"). Multi-channel architecture has proven to be an inefficient means for handling short bi-directional burst communications.

Single channel bi-directional communications networks, suitable for either continuous or burst communications, have historically been implemented through known time division multiplexed architecture wherein each participant is assigned a communications time slot in a cyclical communications signal. As the size of the area 100 and number of subscribers 106 increases, however, the practical and technological limitations of communications control and signal multiplexing techniques render this communications option undesirable, especially for bi-directional burst communications.

Thus, the traditional frequency multiplexed and time division multiplexed system networks and architectures fail to provide efficient means for bi-directional burst communication to a plurality of subscribers scattered throughout a service area. In the present invention, the network architectural strengths of a multiple channel, frequency multiplexed network and a single channel, time division multiplexed network are uniquely combined to provide an efficient single channel, cellular time division multiplexed network capable of handling and controlling bi-directional burst communications for a plurality of subscribers.

The basic premise of the cellular time division multiplexed network of the present invention is that time slots in a time division multiplexed waveform broadcast on a single limited bandwidth channel are reused across the service area for subscriber bi-directional communications. As will be described more fully herein, time slot reusability is accomplished by dividing the service area into a plurality of cells, with multiple cells, in different portions of the service area, simultaneously communicating with subscribers on the same radio frequency channel during the same time slot. With the present architecture, slot width and cycle length are set and fixed at the minimum needed to efficiently handle the requisite communications needs of all cells in the network and subscribers in the service area, regardless of the number of cells required to cover the service area.

Figure 2:
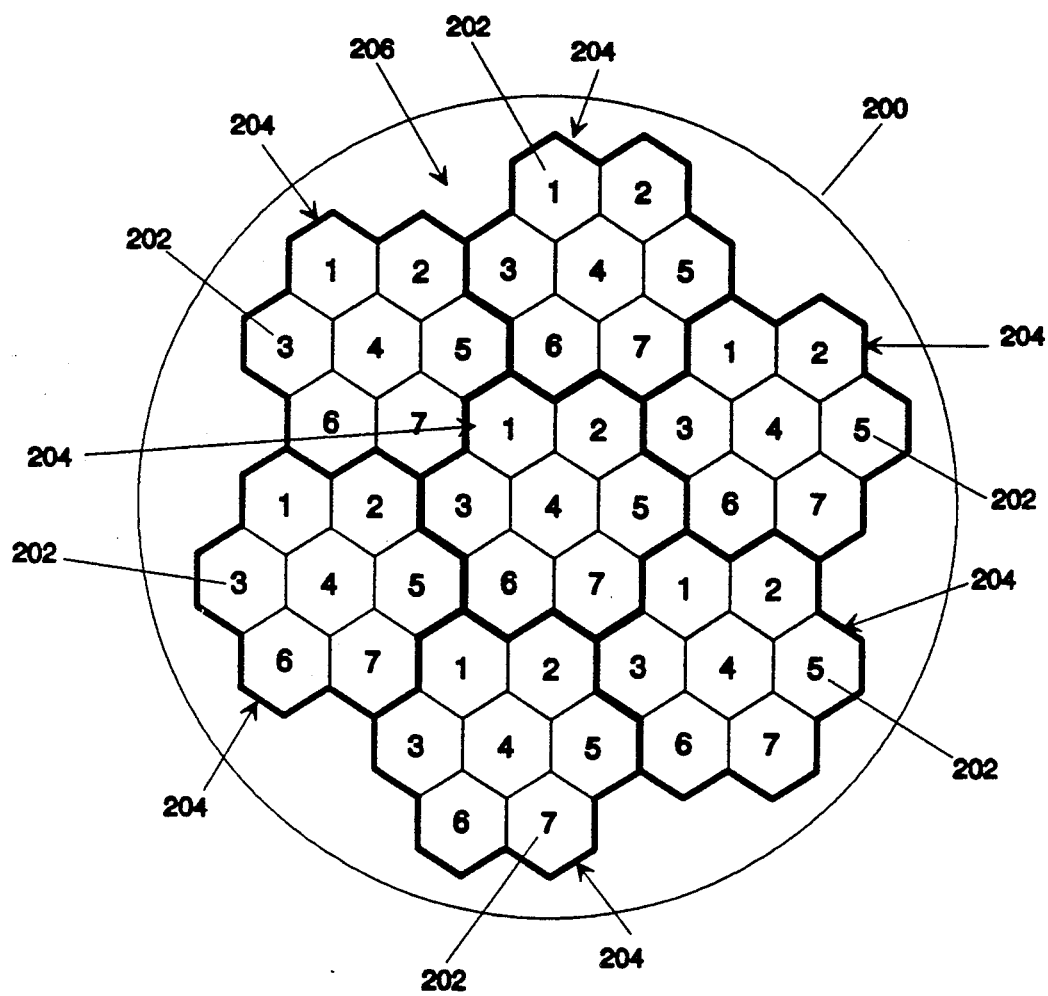
FIG. 2 shows a communications area divided into a number of cells, the cells arranged into clusters to enable reuse of time slots according to the network architecture of the present invention.
Figure 3:
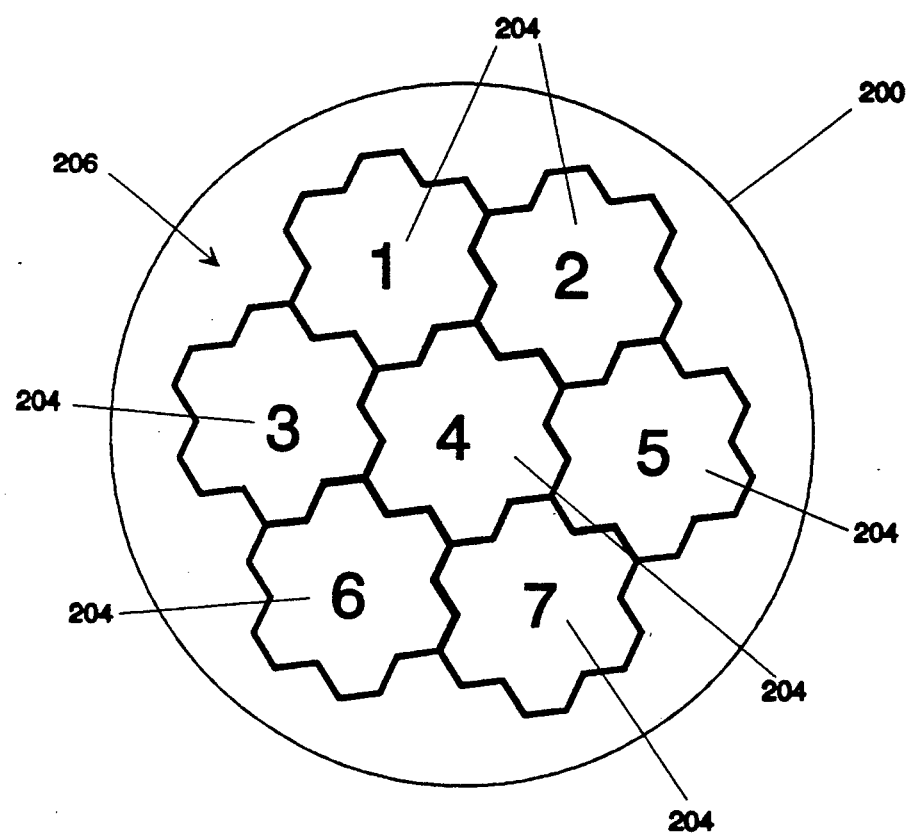
FIG. 3 shows the cell cluster outlines of a cluster group according to the network architecture of the present invention.

Referring now to FIG. 2, there is shown an area 200 over which bi-directional burst communications are provided for a plurality of subscribers according to the method and system network of the present invention. The area 200 is divided into a plurality of cells 202. In order to provide for time slot reusability, the cells 202 of the area 200 are arranged into cell clusters 204 (defined by the bold faced outlines, also shown in FIG. 3). The cells 202 in each cluster 204 are similarly numbered for identification such that no two adjacent cells across the area 200 have the same cell number. As shown in FIG. 3, the clusters 204 are also numbered for identification in the same manner, with a collection of clusters defining a group 206. One or more groups 206 may be needed to cover the service area 200, in which case the groups will be arranged such that no two adjacent clusters 204 or cells 202 across the area will have the same cluster or cell identification number, respectively.

Figure 4:
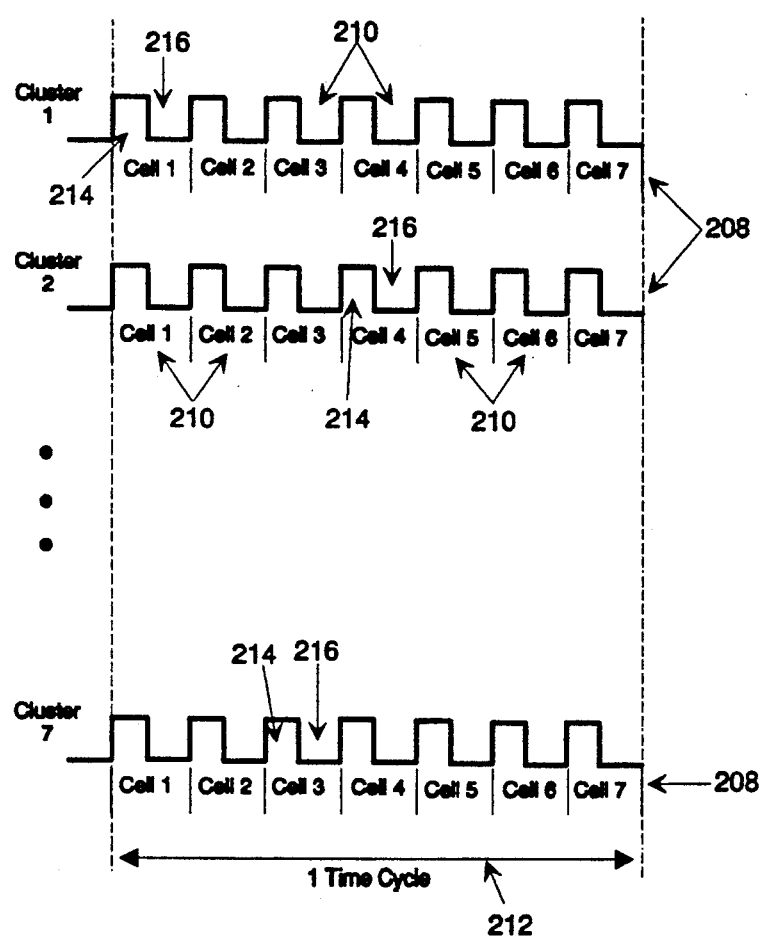
FIG. 4 shows illustrative time division multiplexed waveforms for each cluster of cells in FIGS. 2 and 3.

Referring now to FIG. 4, there are shown illustrative time division multiplexed waveforms 208 for each cluster 204 of cells 202 in FIGS. 2 and 3. The waveforms 208 of FIG. 4 are generic in nature and are shown to illustrate cellular simultaneous time division multiplexed communications across the area 200 according to the communications format of the present invention. The preferred cellular time division multiplexed waveform for the network of the present invention will be described below with respect to FIGS. 6, 8 and 9.

The number of each cell 202 within each cluster 204 corresponds to its time slot 210 location in one cycle 212 of the time division multiplexed waveform 208 transmitted by each cluster. The seven time division multiplexed cluster waveforms 208 are simultaneously and synchronously transmitted over the area 200 on the same radio frequency channel by the clusters 204 of the group 206.

The cell 202 and cluster 204 numbering technique described above serves three purposes. First, the numbering technique identifies the location of each cell and cluster in the group. Second, the cell and cluster numbers identify the time slot location during which simultaneous communications occur. Third, the technique serves to physically separate cells 202 and clusters 204 that are communicating simultaneously (during the same time slot), thereby minimizing any likelihood of signal interference and confusion on the single communications channel (provided signal broadcast levels are regulated as will be described). This numbering technique thus facilitates system architecture reuse of the limited number of time slots for simultaneous bi-directional burst communications by multiple subscribers.

Each cluster 204 and group 206 in FIG. 2 includes seven elements (cells 202 and clusters 204, respectively), however, it will be understood that the number of cells per cluster, and clusters per group is flexible and chosen to provide sufficient physical separation between similarly numbered (and therefore simultaneously transmitting) cells. The element number choice is further affected by the communications cycle length and slot width required by the communications needs of the area. Although the preferred element number is seven, alternative embodiments of the architecture of the present invention utilize other combinations of elements, for example, four and twelve elements, in each cluster 204 and group 206.

Each time slot 210 in the cluster time division multiplexed waveforms 208 of FIG. 4 contains a transmission period 214 and a reception period 216. During the transmission period 214, communications are transmitted to subscribers in each cell 202 corresponding to the numbered time slot 210. During the reception period 216, communications responses are transmitted from subscribers in each corresponding cell 202. However, as will be described, it is possible that in times of high traffic between the clusters 204 and cells 202, the transmission period 214 and reception period 216 may be reassigned to other cells, or the reception period may be used as a second transmission period 214 in the same time slot 210.

Figure 5:
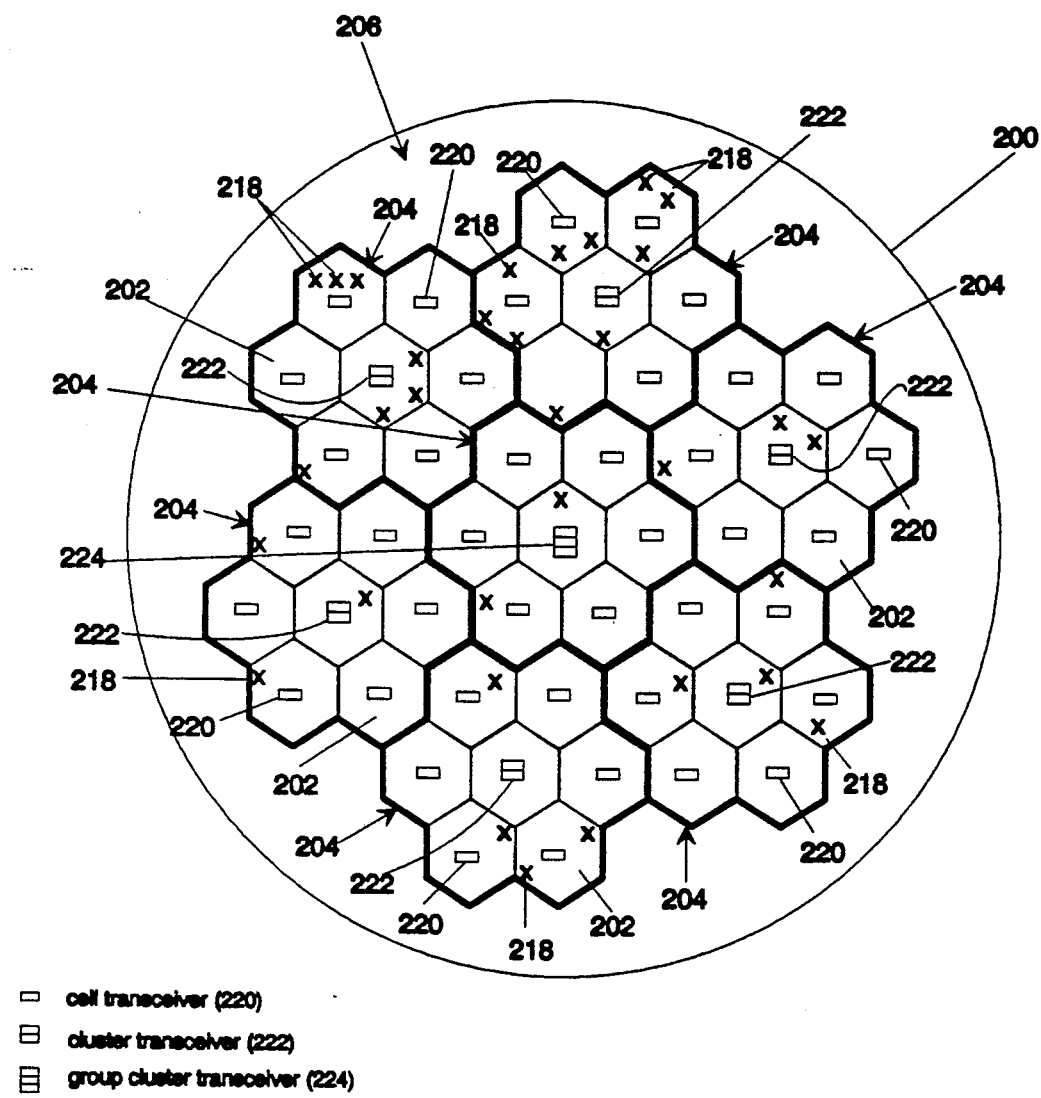
FIG. 5 shows the radio network architecture for providing cellular time division multiplexed bi-directional burst communications to users scattered throughout an area.

Reference is now made to FIG. 5 for a description of the radio network architecture for providing cellular time division multiplexed bi-directional burst communications in the cellularly divided area 200 as shown in FIGS. 2 and 3. Each cell 202 is occupied by a number of subscribers 218 (signified by an "x" in the cell) who are mobile and may not remain within one cell. Each subscriber 218 is equipped with a portable single channel bi-directional burst radio frequency transceiver (reference numeral 280 in FIG. 12). At or near the center of each cell 202, a cell transceiver 220 (FIG. 13) is positioned for bi-directional communications in its cell area over a single radio frequency channel with the portable transceivers carried by each subscriber 218 located therein. At or near the center of each cluster 204, a cluster transceiver 222 (FIG. 13) is positioned for bidirectional communications in its cluster area over the same single radio frequency channel with the cell transceivers 220 located therein. Finally, at or near the center of the group 206 of clusters 204 covering all or part of the area 200, a group cluster transceiver 224 (FIG. 13) is positioned for bi-directional communications in its group area over the same single radio frequency channel with the cluster transceivers 222 located therein. To enhance the efficiency of the radio network, the cell transceiver 220 at or near the center of each cluster 204 functions as both a cell transceiver, cluster transceiver 222 and/or group cluster transceiver 224 (commonly referred to as a base station transceiver). In fact, as will be described with respect to FIG. 13, the cell, cluster and group transceiver circuit is the same across the service area 200, with operation of each transceiver modified according to an applications and functions program executed by an included microprocessor.

Figure 6:
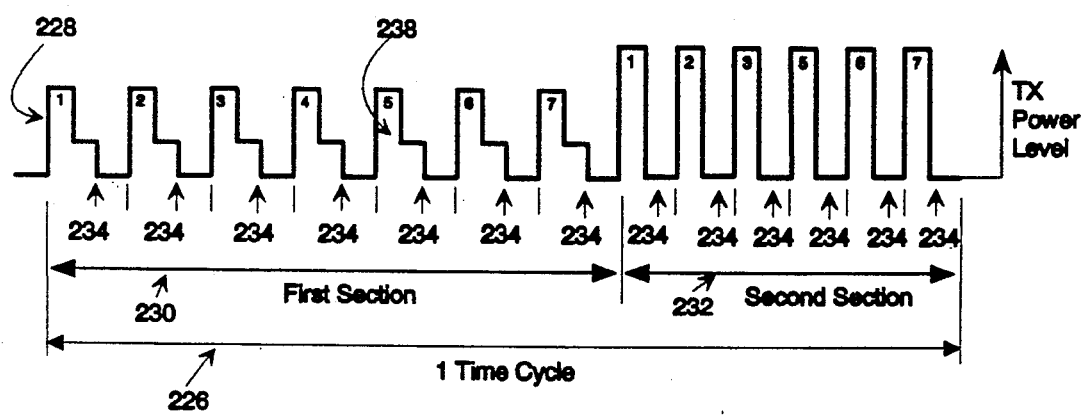
FIG. 6 shows one cycle of the cellular time division multiplexed bi-directional burst signal waveform utilized in the present invention.

All burst radio transmissions by and between the user portable transceivers, cell transceivers 220, cluster transceivers 222 and group cluster transceiver(s) 224 (base stations) shown in FIG. 5 occur over the same single cellular time division multiplexed radio frequency channel. One cycle 226 of a cellular time division multiplexed signal waveform 228 utilized in the present invention for bi-directional burst communications over a single channel is shown in FIG. 6. The waveform 228 is comprised of two sections. The first section 230 contains the time division multiplexed communications between the portable transceivers and the cell transceivers 220, and between the cell transceivers and the cluster transceivers 222. The second section 232 contains the time division multiplexed communications between the cluster transceivers 222 and their group cluster transceiver 224.

Each section of the waveform 228 is comprised of a number of time slots 234. The first section 230, for example, has seven slots 234 corresponding to the seven cell transceivers 220 for the cells 202 in each cluster 204. The second section 232 has six time slots 234 corresponding to six of the seven cluster transceivers 222 for the clusters 204 in the group 206. It is noted that a seventh cluster time slot (at slot number four in the second section 232) is not needed because in the preferred embodiment, one cluster transceiver 222 is also a group cluster transceiver 224 (at cell number four in cluster number four of FIGS. 2 and 3). As the second section 232 of waveform 238 is provided for communications between the cluster transceivers 222 and group cluster transceiver 224, a time slot 234 for communication between the combined cluster/group cluster transceiver is unnecessary as such a communication occurs within the hardware of the transceiver. It will, of course, be understood that if the cluster transceiver and group transceiver are not the same, then an extra time slot 234 in the second section 232 will be needed.

Each time slot 234 is divided into a transmission period and a reception period whose boundaries and functions will be described below with respect to FIGS. 8 and 9. For the time slots 234 in the first section 230, the transmission period is used to transmit from the cell transceivers 220 to their cluster transceiver 222 and to any portable transceivers in their cell area. The reception period is for receiving messages therefrom. In the second section 232, the transmission period is used to transmit messages from the cluster transceivers 222 to the group cluster transceiver 224. The reception period in the second section 232 is for receiving messages from the group cluster transceiver 224.

Due to the nature of communications traffic in terms of both time and place, cells 202, clusters 204 or groups 206 periodically do not have any bi-directional burst communications traffic when their time slots 234 cycle through for communication. At the same time, another cell 202, cluster 204 or group 206 may be overloaded with bi-directional burst communications requests or needs and unable to provide communications during its time slot 234 in the cycle 226. In either case, the time slot (a valuable commodity in a single channel bi-direction communications network) is inefficiently used by the system because some communications are irretrievably lost or improperly and incorrectly sent or received.

To address this communications traffic problem of under- and over-utilization of available time slots 234, the cellular time division multiplexed network architecture monitors cell 202, cluster 204 and group 206 communications traffic, and reallocates time slots, when available, to overcrowded or overloaded cells, clusters and groups. This slot reallocation function advantageously utilizes the time division multiplexed waveform 228, in a manner to be described, to detect those cells 202, clusters 204 and groups 206 not needing or using their time slot 234, and notify other cells, clusters or groups of slot availability. In such a situation, an unused time slot 234 in the first section 230 of the waveform 228 can be reallocated to any other adjacent cell 202 in the cluster 204 that is overloaded with communications traffic. With a seven cell cluster 204, as shown in FIG. 2 for example, this reallocation involves the three adjacent cells within the same cluster. Similarly, a cluster's unused time slot 234 in the second section 232 of the waveform 228 is reallocated to any other adjacent cluster 204 in the group 206.

Figure 7:
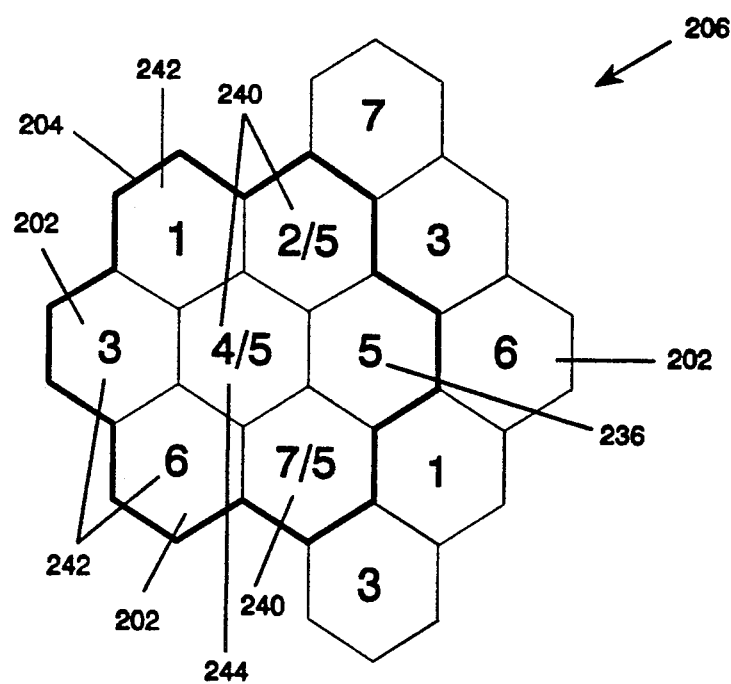
FIG. 7 shows a single cluster of seven cells and a portion of the adjacent clusters illustrating the time slot reallocation function of the present invention.

The operation of the cell 202 and cluster 204 time slot 234 reallocation function ma be best understood through an example as illustrated in FIG. 7 wherein a single cluster 204 of seven cells 202 and a portion of the adjacent clusters in the group 206 are shown. If cell number five (cell 236) is overloaded such that it cannot handle all requested communications during its assigned fifth time slot 238 in the waveform 228 (FIG. 6), the time slot of any adjacent cell 240 (cells two, four and seven) in the cluster 204 is borrowed to handle the extra communications. Cell number five (cell 236), however, cannot borrow the time slot of either cells one, three or six (cells 242) in cluster 204 because to do so would have two similarly numbered adjacent cells (across the cluster border) communicating at the same time. This would violate the cell numbering rules and increase the likelihood that a signal conflict or confusion will occur. Overall, cell number four (cell 244) is in the best position for reallocation in that the time slot of any cell 202 in the cluster 206 is available for borrowing without fear of signal conflict or confusion.

The reallocation of all cluster time slots 234 is regulated in a similar fashion. As shown in FIG. 3, the clusters 204 in the group 206 are numbered in a manner similar to the cell numbering such that if more than one group 206 is needed to cover the area, no two adjacent clusters would have the same cluster identification number. When a cluster 204 time slot 234 in the second section 232 of the waveform 228 is not being used, it may be borrowed for a cycle 226 by an adjacent cluster in the group 206.

Figure 8:
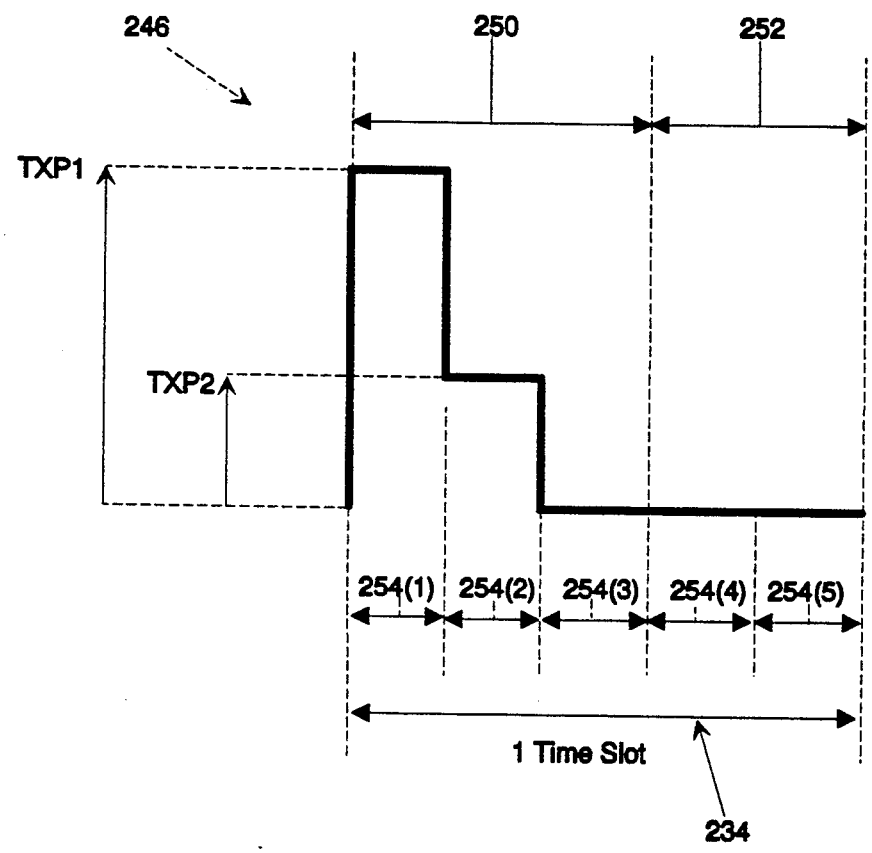
FIG. 8 shows the standard shape of the waveform transmitted in each time slot in the first section of the multiplexed waveform.
Figure 9:
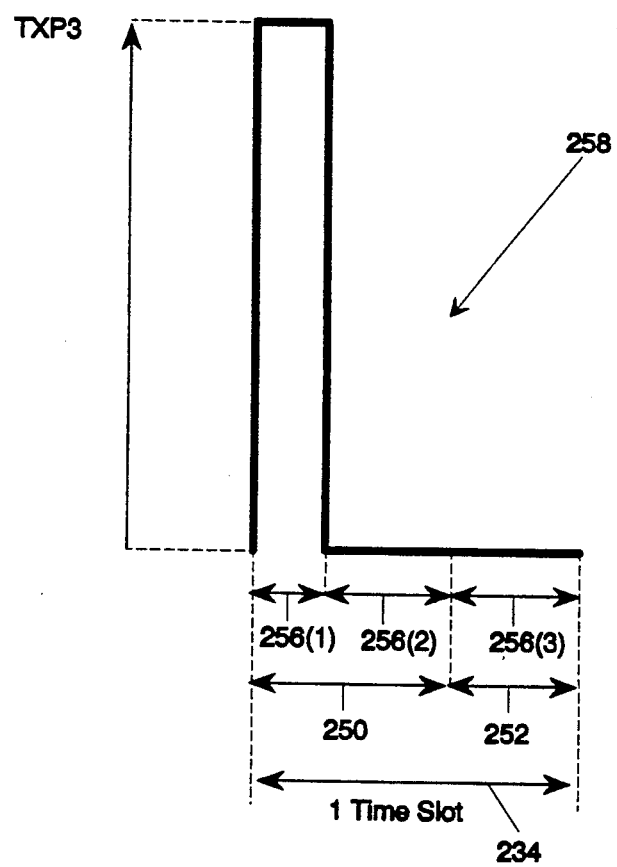
FIG. 9 shows the standard shape of the waveform transmitted in each time slot in the second section of the multiplexed waveform.

Reference is now again made to FIG. 6 in conjunction with FIGS. 8 and 9 wherein there is shown the standard shape of the waveform transmitted in each time slot 234 in the first and second sections, 230 and 232, respectively. By regulating the broadcast power of the transceivers, the effective radius of propagation of the broadcast signal around the transceiver is controlled such that the radio signals of similarly numbered cell and cluster transceivers will not interfere with each other. The circuit for regulating broadcast power is described below with respect to FIG. 13.

The waveform 228 in FIG. 6 and the standard section waveforms in FIGS. 8 and 9 illustrate this signal power regulation function through changes in the amplitude of the signal waveform. The greater the amplitude of the signal, the farther the resulting broadcast radio signal will propagate. In implementing this controlled propagation concept (see FIGS. 5 and 11), cell transceivers 220 will have a minimum effective transmission radio range equal to the approximate radius of the cell 202, and a maximum range less than one-half the distance to the closest similarly numbered cell in the group 206. In the preferred embodiment, the maximum cell transceiver 220 radio range is equal to two times the approximate cell radius. The cluster transceivers 222 will have a minimum effective transmission radio range approximately equal to twice the radius of a cell 202, and a maximum range less than one-half the distance to the closest similarly numbered cluster in another group 206 in the area 200. The group cluster transceiver 224 will have a minimum effective transmission radio range equal to the distance between two similarly numbered cells 202 in the group 206.

As mentioned above, the waveform 228 in FIG. 6 is shown comprised of two sections. The first section 230 contains the time division multiplexed communications between the cell transceivers 220 and cluster transceivers 222, and between cell transceivers and portable subscriber transceivers. The standard waveform 246 (FIG. 8) is transmitted in each time slot 234 in the first section 230 of the waveform 228. The second section 232 contains the time division multiplexed communications between the cluster transceivers 222 and the group cluster transceiver(s) 224. The standard waveform 248 (FIG. 9) is transmitted in each time slot 234 in the second section 232 of the waveform 228.

Each standard time slot waveform, 246 and 248, comprises a variable amplitude signal used to regulate the propagation of the broadcast communications signals between the various transceivers of the network. Each time slot 234 is divided into a transmission period 250 and a reception period 252 defined by a number of sub-slots, 254 and 256, in the standard time slot waveforms, 246 and 248, as illustrated in FIGS. 8 and 9, respectively. These sub-slots, 254 and 256, function to synchronize all bi-directional communications across the area 200.

The standard slot waveform 246 shown in FIG. 8 for the first section 230 of the waveform 228 is divided into five sub-slots 254 during which particular communications functions are performed. The first sub-slot 254(1) is dedicated to the transmission of identification numbers for cell 202, cluster 204 and group 206 areas and cell reallocation information from the cell transceiver 220 to the cluster transceiver 222. This information is broadcast at a power level (TXP1) sufficient to enable the radio signal to propagate from the cell transceiver 220 to its cluster transceiver 222 without interfering with a simultaneous transmission from a similarly numbered cell 202. The cell reallocation information is a signal to the cluster transceiver 222 regarding the communication traffic of the cell 202 and functions as a request for reallocation when traffic is heavy and an indication of availability when traffic is light.

The next sub-slot 254(2) is dedicated to the transmission of identification numbers for cell 202, cluster 204 and group 206 areas and cell reallocation information from the cell transceiver 220 to the portable transceivers in its cell area. The power level (TXP2) of the broadcast signal transmission of this information is just strong enough so that the signal can be received throughout the cell area. The reallocation information in this case functions to notify portable transceivers not to communicate because of traffic overload and reallocation of the cell's time slot 234, or to inform the portable transceivers of the availability of extra time for communication within a time slot. Sub-slots 254(1) and 254(2) are part of the transmission period 250.

The final three sub-slots 254(3), 254(4) and 254(5) are dedicated to message traffic. Sub-slot 254(3) is also a part of transmission period 250 and is used for cell 202 to cluster 204 transmissions or cell to portable transceiver transmissions. Sub-slot 254(4) is a part of the reception period 252 and is used for message transmissions from the portable transceivers to the cell transceiver 220 in each cell 202. With sub-slot 254(5), the cell transceiver 220 receives reallocation information, commands, and messages from its cluster transceiver 222 in response to the reallocation signal in sub-slot 254(1) regarding use of time slots 234 in the first section 230 of the waveform 228. Sub-slot 254(5) is also a part of the reception period 252.

The standard slot waveform 248 shown in FIG. 9 for the second section 232 of the waveform 228 is divided into three sub-slots 256 during which particular communications functions are performed. The first sub-slot 256(1) is a part of the transmission period 250 dedicated to the transmission of identification numbers for cluster 204 and group 206 areas and cluster reallocation information from the cluster transceiver 222 to the group cluster transceiver 224. This information is transmitted at a power lever (TXP3) sufficient to enable the radio signal to propagate from the cluster transceiver 222 to group cluster transceiver 224 without interfering with a simultaneous transmission from a similarly numbered cluster 204 in another group 206. The cluster reallocation information is a signal to the group cluster transceiver 224 regarding the communication traffic of the cluster 204 and functions as a request for reallocation when traffic is heavy and an indication of availability when traffic is light.

The next two sub-slots 256(2) and 256(3) are dedicated to message traffic. Sub-slot 242(2) is also a part of the transmission period 250 used for cluster 204 to group 206 message transmissions. The last sub-slot 256(3) is a part of reception period 252 used to carry messages from the group transceiver 224 to the cluster transceiver 222, and also reallocation information and commands in response to the reallocation signal in sub-slot 256(1) regarding use of time slots 234 in the second section 232 of the waveform 228.

Figure 10:
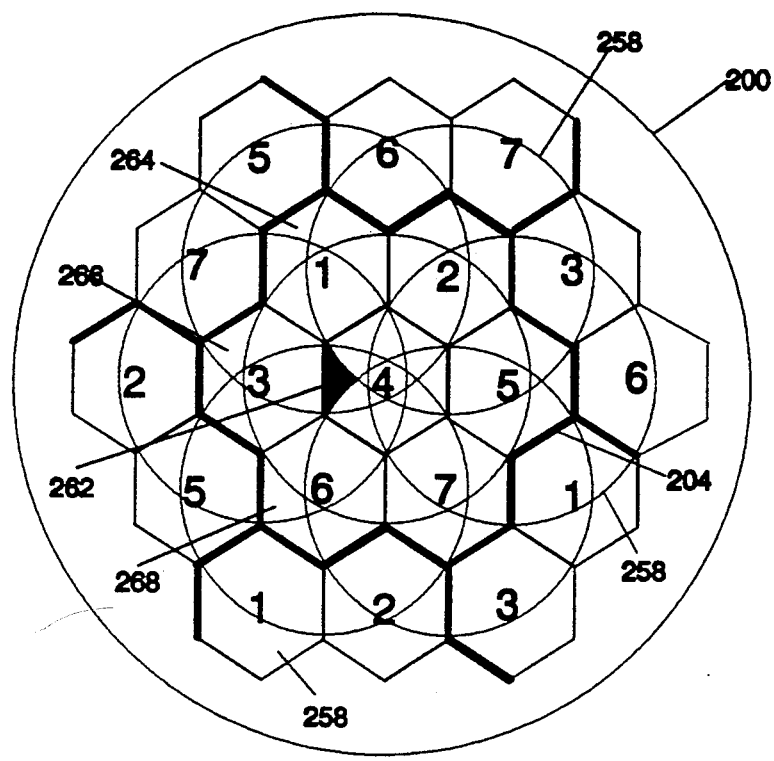
FIG. 10 illustrates the use of the variable amplitude of the transmission waveform in the network of the present invention as a subscriber location finder.

The variable amplitude of the transmission waveform 228 (as shown in FIGS. 6, 8 and 9) is advantageously used by the bi-directional burst network of the present invention as a subscriber location finder. Reference is now made to FIG. 10 wherein a portion of the area 200 including one cluster 204 of the cellular network as in FIG. 2 is shown. The radius of propagation of the first sub-slot 254(1) of the waveform 228 transmitted by each cell transceiver 220 is determined and mapped onto the cluster 204 in a manner similar to that shown by the circular areas 258 (centered on each cell 202, see FIG. 2). Subscribers determine their approximate location, in the fourth cell 260, for example, by list-ning with their portable transceivers for the cell and cluster identification number information transmitted during each first sub-slot 254(1) by the cell transceivers 220 of each of the surrounding cells 202.

By comparing the identity of each signal received to the known approximate cell 202 circular broadcast areas 258 illustrated by the map of FIG. 10, the location of a user within a cell is approximately determined by the interaction area of all circular areas 258 associated with cells 202 identified in the received signal broadcasts. For example, a subscriber located somewhere in the shaded location 262 of cell 260 would receive subslot 254(1) identification number broadcasts from surrounding cells 264, 266 and 268 as well as from cell 260 in which the subscriber is located. The shaded area 262 is defined by the intersection of the circular areas 258 associated with cells 260, 264, 266 and 268.

The location system enables the cell transceiver 220 to approximately locate a subscriber by requesting that the subscriber's portable transceiver identify all cells it can "hear" from the first sub-slot 254(1) identification broadcasts and report the cell identification information back to the network where a map comparison (FIG. 10) for location determination is made. It will, of course, be understood that if the subscriber were in any cell other than the center cell of a cluster 204, information would be received from cell transceivers 220 both within and without the cluster where the subscriber is located. Thus, the information needed and used for approximately locating a subscriber will include both cell and cluster identification numbers (see FIG. 3).

Figure 11:
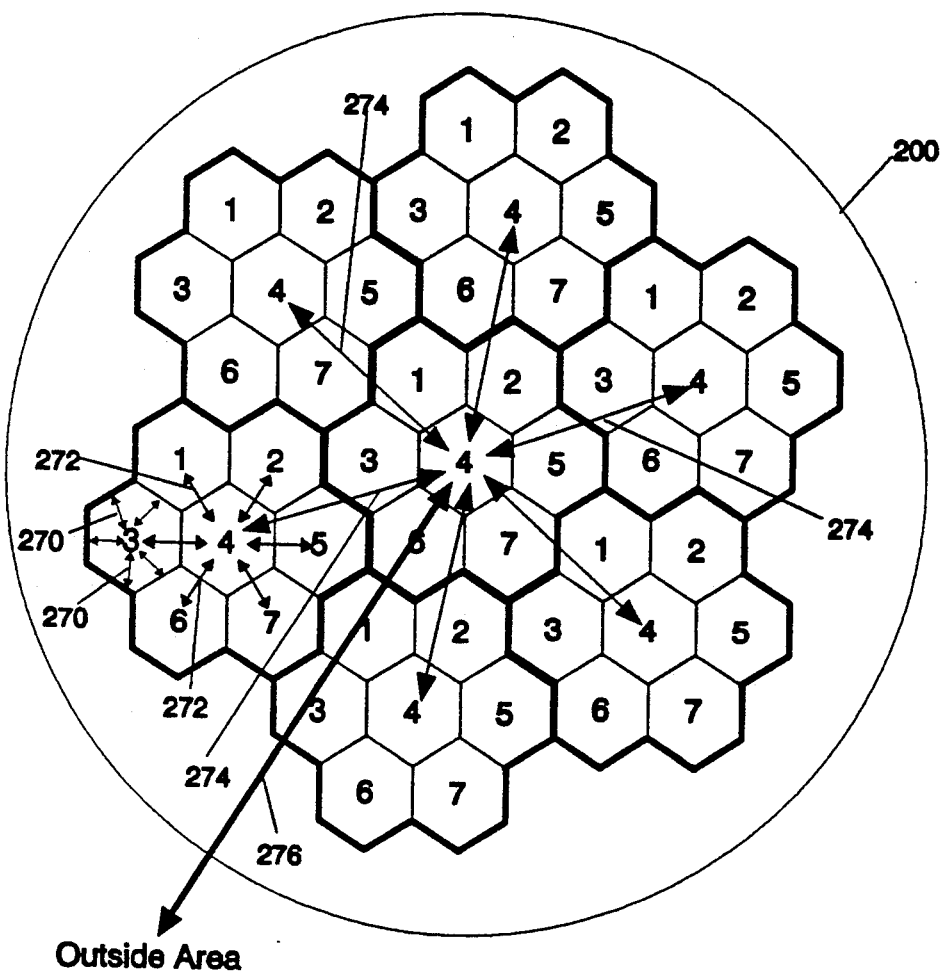
FIG. 11 shows the network hierarchy of the present invention illustrating transmission paths for message handling.

A more complete understanding of the efficiency of the network waveform 228 and the organization of communications by and between portable transceivers, cell transceiver 220, cluster transceivers 222 and group cluster transceivers 224 may be had by reference to FIG. 11 showing the communications hierarchy of the cellular time division multiplexed communications network. Communications between the portable transceivers and cell transceivers are illustrated by each bi-directional arrow 270. As discussed above, these communications are simultaneously occurring over a single radio frequency channel with portable transceivers only communicating with their cell transceiver during the cell's assigned time slot 234 (sub-slot 254(4)). In the preferred embodiment, signal interference and confusion between multiple portable transceiver communications in a single cell are avoided by uniquely delaying response transmissions from each of the portable transceivers to the cell transceiver. Thus, no two portable transceivers will be communicating on the single channel at the same time within the assigned time slot if the possibility of message collision is detected.

Communications between the cell transceivers and their cluster transceiver are illustrated by each bi-directional arrow 272. These communications are also simultaneously occurring over the same single radio frequency channel with cell transceivers and their cluster transceiver communicating only during the cell's assigned time slot 234 (sub-slots 254(3) and 254(5)). The unique cell numbering system of the present invention allows for the limited number of time slots to be reused by each cluster across the area 200.

Communications between the cluster transceivers and their group cluster transceiver are illustrated by each bi-directional arrow 274. These communications are also simultaneously occurring over the same single channel with cluster transceivers and their group cluster transceiver communicating only during the cluster's assigned time slot 234 (sub-slots 256(2) and 256(3)). Again, the unique cell and cluster numbering technique allows for the limited number of time slots available in one broadcast cycle to be reused across the area 200 using a single channel without fear of signal interference or confusion. Communications between the group 206 and the outside are illustrated by the bi-directional arrow 276.

The communications hierarchy illustrated by the bi-directional arrows 270, 272, 274 and 276 provides a deterministic approach to communications throughout the area. This means that the delay for communications throughout the network is fixed and known. For example, every communication from outside of the area 200 to any cell in the area requires a fixed number of steps regardless of physical distance: (1) outside area to group cluster transceiver (arrow 276), (2) group cluster transceiver to cluster transceiver (arrow 274), (3) cluster transceiver to cell transceiver (arrow 272) and (4) cell transceiver to portable transceiver (arrow 270). Time determinism is vitally important in a time based (multiplexed) communications architecture due to the importance of maintaining proper sequencing of communications.

Figure 12:
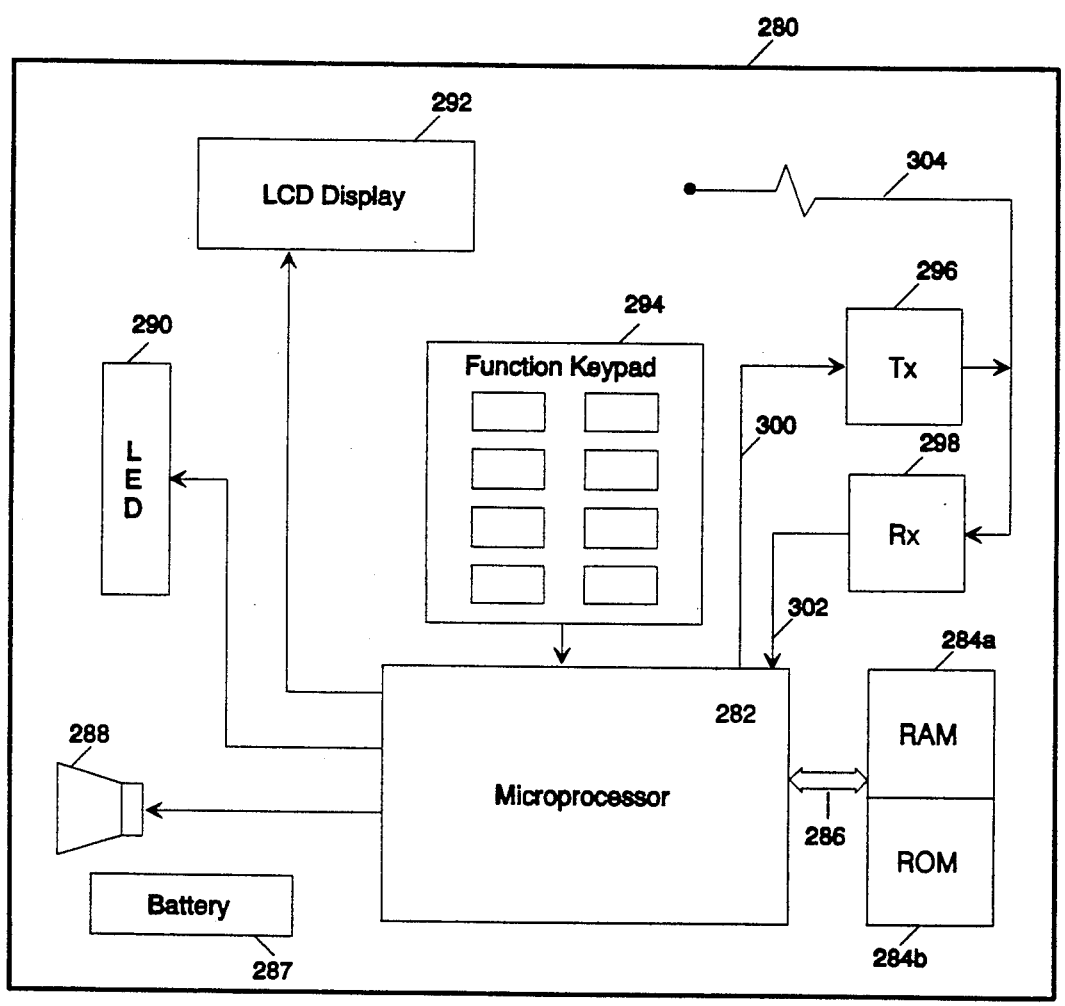
FIG. 12 is a block diagram for a portable subscriber transceiver carried by each subscriber.

Referring now to FIG. 12, there is shown a block diagram for a portable subscriber transceiver 280 carried by each subscriber 218. A dedicated microprocessor 282 handles all data processing functions of and directs all communications to and from the portable transceiver 280 including executing a communications application program and function control program. The basic applications and function control programs for the portable transceivers 280 are stored in a read-only memory (ROM) 284a. A randomaccess memory (RAM) 284b is also included to provide a temporary, variable usage memory for temporary storage of applications program parameters, other data and subscriber communications messages. Additional applications and functions programs are down loaded from the network to the portable transceivers when needed and stored in the RAM 284b. Data bus 286 couples the microprocessor 282 to the memory 284. A battery 287 is also provided to power the components of the portable transceiver 280.

Also connected to the microprocessor 282 are three output devices; a speaker 288, an LED display 290 and an LCD character display 292. These devices enable the portable transceiver 280 to notify the subscriber 218 of personal burst communications. The speaker 288 and LED display 290 provide audible and visual notice of communications while the LCD display 292 provides a displayed message for the subscriber 218 regarding the incoming and outgoing communication. A function keypad 294 is provided for the subscriber 218 to input communications into the microprocessor 282 for subsequent transmission. The function keypad 294 includes alpha numeric keys and a number of special purpose keys. With the function keypad 294, the subscriber can respond to a received burst communication, or initiate a communication over the cellular time division multiplexed network as described with respect to FIG. 5.

The radio transceiver circuit for the portable transceiver 280 is comprised of a transmitter circuit 296 and receiver circuit 298 connected to the microprocessor 282 via lines 300 and 302, respectively, for message transmission and reception using an internal antenna 304. The transmitter and receiver, 296 and 298, respectively, each include a modulation and demodulation circuit. In the preferred embodiment, a frequency shift keyed (FSK) modulation scheme is employed to handle communications between the portable transceiver 280 and the cell transceiver 220.

The applications and functions programs executed by the microprocessor 282 perform three operations. First, the programs cause the microprocessor 282 to monitor the assigned communications channel for a broadcast during subslot 254(2) from cell transceivers 220. This sub-slot contains synchronization information used by the microprocessor 282 to control the timing of communications from the transceiver 280 over the network. Following the reception of data during sub-slot 254(2), the portable transceivers communicate over the single channel (sub-slot 254(4)). If two portable transceivers 280 respond at the same time (sub-slot 254(4)), this is detected and the transceivers will delay responding again according to a delay time such that separate communications do not interfere with each other.

The second operation performed by the functions programs executed by the microprocessor 282 is in ascertaining subscriber location in the area 200 as described with respect to FIG. 10. Again, the microprocessor monitors the assigned communications channel for a broadcast during sub-slot 254(2) from the cell transceivers 220. This broadcast during sub-slot 254(2) contains identification information for each cell whose signal can be "heard" by the portable transceiver 280. This information is periodically transmitted by each portable transceiver 280 over the network for location determination in the manner described above (FIG. 10). Alternatively, the cell transceiver 220 will send a signal to the portable transceiver 280 requesting that the cell identification information be relayed back to the network for a subscriber location determination.

The third operation performed by the portable transceiver is the handling and managing of personal communications services. For example, an alphanumeric keypad is available to allow the subscriber to respond to received communications. Furthermore, included special function keys allow the subscriber to initiate a communication, signal an emergency and determine approximate location. Moreover, if the network is providing out-of-band communications management functions, the subscriber's transceiver is capable of redirecting, answering and otherwise managing in-band communications regardless of subscriber location.

Figure 13:
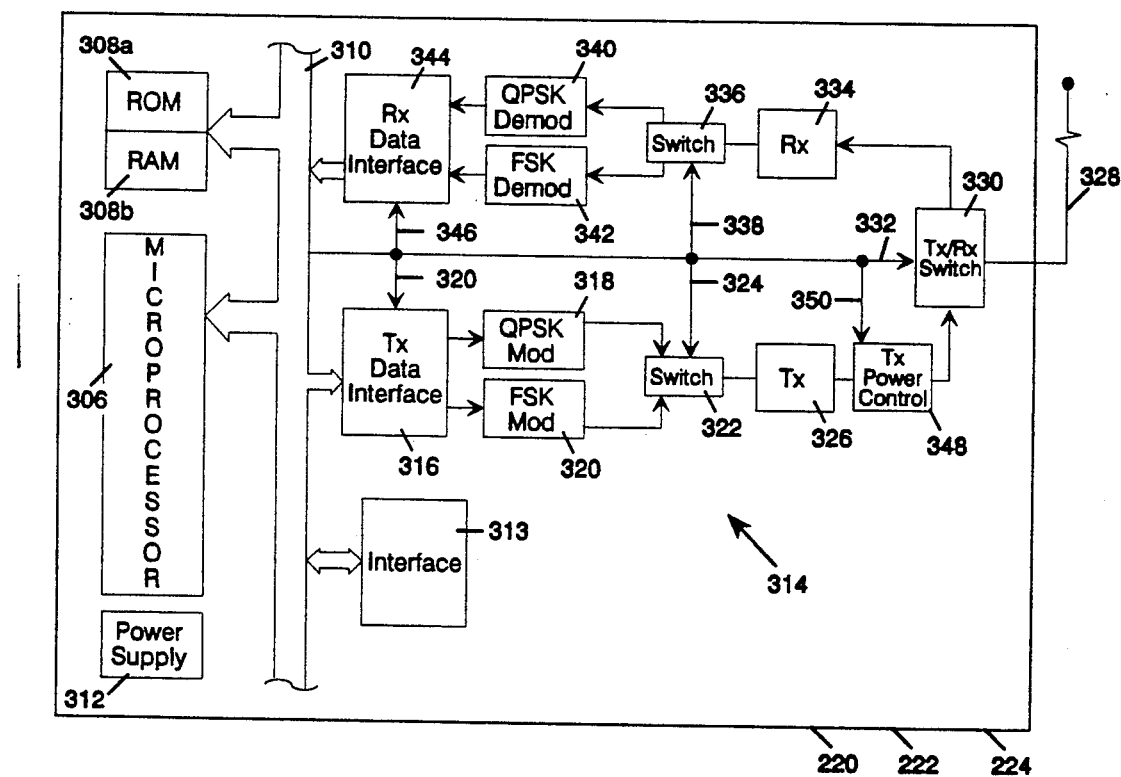
FIG. 13 is a block diagram for a cell, cluster or group transceiver as used in the cellular time division multiplexed network of the present invention.

Referring now to FIG. 13, there is shown a block diagram for the cell transceiver 220, or the cluster transceiver 222 or the group cluster transceiver 224 (collectively referred to herein as a base station transceiver) as used in the cellular time division multiplexed network of the present invention. The cell transceiver 220, cluster transceiver 222 and group cluster transceiver 224 utilize the same circuit, but operate in a different manner depending on the applications and functions programs executed by a microprocessor 306. This system component redundancy will be needed if the cell transceiver 220 at the center of each cell also functions as a cluster transceiver 222 when located at the center of a cluster 204 or functions as a group cluster transceiver 224 when located at the center of a group 206. The base station transceiver circuit is modularly implemented such that a transceiver can be specifically configured or modified according to the transceiver's desired function.

The applications and functions programs for the base station transceiver are stored in a read-only memory 308a. A random-access memory 308b is also included to provide a temporary, variable usage memory for storage of applications program parameters and other data. Additional applications and functions programs are down loaded from the network to the transceiver when needed and stored in the RAM 308b. Data bus 310 couples the microprocessor 306 to the memory 308. A power source 312, provided from an external input and/or a back-up battery, supplies the operating power for all components of the base station transceiver. An interface 313 is included to enable the communications transmissions of the base station transceiver to occur over other media, for example a common wireline. In the present application, the interface provides means for linking the group 206 with the outside area (arrow 276).

In the preferred embodiment of the present invention, communications between portable transceivers 280 and cell transceivers 220 rely on frequency shift keyed (FSK) modulation and communications between the cell transceivers 220, cluster transceivers 222 and group cluster transceivers 224 rely on quadrature phase shift keyed (QPSK) modulation. The cell transceivers 220, cluster transceivers 222 and group cluster transceivers 224 are thus equipped to process both FSK and QPSK modulation. The dual modulation scheme is employed in the network as FSK modulation presents the most cost effective and simplest circuit for the portable transceiver 280. More advanced modulation schemes, such as QPSK, are used for inter-base station transmissions because cost and circuit simplicity are not as important considerations.

To implement the dual use modulation schemes in a single transceiver, the cell, cluster and group transceiver utilizes a dual modulator/demodulator circuit (DMD) 314. On the transmit side of the DMD 314, a transmit interface 316 couples communications information either to a QPSK modulator 318 or an FSK modulator 320 according to a modulation selection signal received from the microprocessor 306 over line 320. The modulated information output from the QPSK and FSK modulators, 318 and 320, respectively, is applied to a switch 322. According to the modulation selection signal received by the switch 322 over line 324, the selected modulated signal is output to a transmitter circuit 326 where the signal is modulated with a carrier for broadcast by antenna 328 over the single channel time division multiplexed network of the present invention. A transmit/receive switch 330, controlled by a transmit/receive selection signal on line 332, properly couples the modulated information to the antenna 328.

On the receive side of the DMD 314, the transmit/receive switch 330, under control of the transmit/receive selection signal on line 332, couples received burst communications to a receiver circuit 334 where the signal is downconverted to baseband for subsequent QPSK or FSK demodulation as needed. A switch 336, under the control of the modulation selection signal received over line 338, couples the downconverted communication to the proper QPSK demodulation circuit 340 or FSK demodulation circuit 342. A receiver interface 344 couples the demodulated QPSK or FSK communication to the data bus 310 according to the modulation selection signal received from the microprocessor 306 over line 346.

The base station transceiver described in FIG. 13 performs several major functions. First, the timing, control and synchronization of the time division multiplexed communications over the network are controlled by the applications and functions programs executed by the microprocessor 306. According to the modulation selection and transmit/receive selection signals from the microprocessor 306, the time division multiplexed waveform 238 (FIG. 6) is generated and maintained over time. Furthermore, the proper selection of the modulation selection and transmit/receive selection signals by the programmed microprocessor 306 configures the base station transceiver to be either a cell transceiver 220, cluster transceiver 222 or group transceiver 224. Second, the microprocessor 306 controls the broadcast power of the communications transmitted by the antenna 328. A transmitter power control 348 receives the QPSK or FSK modulated communication and selectively controls the signal strength output (TXP1, TXP2 and TXP3) according to an amplitude control signal received from the microprocessor 306 on line 350 to generate the cellular time division multiplexed waveform 228 (FIGS. 6, 8 and 9).

Third, the base station transceiver functions to properly route communications between each subscriber and the outside according to the communications hierarchy described above and shown in FIG. 11. Fourth, when configured as a cell transceiver 220, the base station provides the cell, cluster and group identification information at the proper broadcast power to enable the network to approximately locate subscribers (FIG. 10). Fifth, the base station monitors communications traffic over the network to identify cells 202 and clusters 204 with time slots 234 available for or requesting reallocation. Lastly, the base station monitors and manages the network by detecting and identifying traffic problems, system errors and component breakdowns.

Although a preferred embodiment of the method and network system for providing limited bandwidth bi-directional burst telecommunications has been illustrated in the accompanying Drawings and described in the foregoing Detailed Description, it will be understood that the invention is not limited to the embodiment disclosed, but is capable of numerous rearrangements, substitutions and modifications without departing from the spirit of the invention.

We claim:

1. A method for providing personal communications services to a number of users in a service area, the service area subdivided into a plurality of cells, the plurality of cells arranged into a plurality of cell clusters, each cell cluster having a first plurality of cells, the plurality of cell clusters arranged into a plurality of cluster groups, each cluster group having a first plurality of cell clusters, comprising the steps of:

transmitting communications between the plurality of cells, cell clusters and cluster groups on a single communications frequency; and time division multiplexing the communications on the single frequency into communications cycles, each communications cycle divided to include:

a plurality of first time slots, each first time slot assigned to simultaneously carry communications of multiple cells across the service area, said communications limited to simultaneous communications by one cell per cell cluster for the plurality of cell clusters; and a plurality of second time slots, each second time slot assigned to simultaneously carry communications of multiple cell clusters across the service area, said communications limited to simultaneous communications by one cell cluster per cluster group for the plurality of cluster groups.

2. The method for providing personal communications services as in claim 1, further including the step of:

regulating the power of the communications on the single frequency to minimize communications interference between the simultaneous communications of multiple cells in different cell clusters and between the simultaneous communications of multiple cell clusters in different cluster groups during the same first and second time slots, respectively.

3. The method for providing personal communications services as in claim 1, further including the steps of:

broadcasting a location communication from each cell, the communication identifying the broadcasting cell and propagating beyond the area for the cell into adjacent cell areas to define a broadcast area;

storing a map of cells with broadcast areas for each cell across the service; and determining the location of a user within a cell of the service area by:

receiving the broadcast location communications of cells to identify cells proximate to the user; and comparing the identified proximate cells to the stored map of cells and cell broadcast areas to locate the user in an area within a cell defined by the intersection of the broadcast areas for each cell identified through the received broadcast location communications.

4. The method for providing personal communications services as in claim 1, further including the steps of:

reallocating the use of first time slots to allow a cell the use of multiple first time slots during a single communications cycle, wherein the first time slots are reallocated from other cells in the same cell cluster; and reallocating the use of second time slots to allow a cell cluster the use of multiple second time slots during a single communications cycle, wherein the second time slots are reallocated from other cell clusters in the same cluster group.

5. The method for providing personal communications services as in claim 4 wherein the steps of reallocating use of first and second time slots further include the step of:

limiting the reallocation of a time slot to a cell or cell cluster when reallocation will result in two adjacent cells or cell clusters across the service area being assigned for simultaneous communication during the same first or second time slot, respectively, during a single communications cycle.

6. A system for providing bi-directional burst telecommunications within a service area, the service area divided into a plurality of communications cells, each cell defining a cell area, comprising:

a cell transceiver for each cell;

a cluster transceiver for each one of a plurality of clusters of cells within the service area, each cluster of cells defining a cluster area, each cluster transceiver communicating with the cell transceivers in its cluster area;

a group transceiver for each one of a plurality of groups of clusters of cells within the service area, each group of clusters of cells defining a group area, each group transceiver communicating with the cluster transceivers in its group area; and means for time division multiplexing communications between the cell transceivers and each cluster transceiver and between the cluster transceivers and each group transceiver across the service area, all communications in the service area occurring on a single frequency using a cyclical communications signal, each cycle of the cyclical signal divided into a plurality of first and second time slots, wherein:

each first time slot is dedicated to one cell transceiver per cluster area for communications between the cell transceiver and its cluster transceiver, such that multiple cell transceivers, each cell transceiver in a different cluster area, simultaneously communicate on the single frequency during the same first time slot; and each second time sot is dedicated to one cluster transceiver per group area for communications between the cluster transceiver and its group transceiver, such that multiple cluster transceivers, each cluster transceiver in a different group area, simultaneously communicate on the single frequency during the same second time slot.

7. The system for providing bidirectional burst telecommunications as in claim 6 wherein each cell transceiver further includes:

means for regulating the broadcast power of cell transceiver communications to diminish the likelihood that simultaneous cell transceiver communications by different cell transceivers in different cluster areas during the same first time slot will interfere with each other.

8. The system for providing bi-directional burst telecommunications as in claim 6 wherein the means for time division multiplexing communications between the cell transceivers and the cluster transceivers across the service area comprises:

means for generating on the single frequency a first cyclical communications signal;

means for dividing each cycle of the first cyclical signal into the plurality of first time slots, each first time slot dedicated for communications by a certain assigned cell transceiver in each cluster area thereby enabling each time slot to be simultaneously used by multiple cell transceivers in different cluster areas across the service area.

9. The system for providing bi-directional burst telecommunications as in claim 6 further including a plurality of user personal transceivers, each personal transceiver communicating on the single frequency with the cell transceiver for the cell area where its user is located during the time slot dedicated to the cell transceiver where the user is located.

10. The system for providing bi-directional burst telecommunications as in claim 9 further including means for locating users within the service area comprising:

means as a part of each cell transceiver for transmitting cell identification information, the identification transmission propagating beyond the area for the cell transceiver into other adjacent cell areas to define a broadcast area;

means for storing a map of the service area including the broadcast area of each cell transceiver and the cell identification information;

means as a part of each personal transceiver for receiving the identification information transmitted by cell transceivers to identify cell transceivers proximate to the personal transceiver; and means for comparing the identified cell transceivers proximate to the personal transceiver to the stored map of broadcast areas and cell identifications to locate the user in a portion of a cell area defined by the intersection of the broadcast areas for each proximate cell identified through the received identification information.

11. The system for providing bidirectional telecommunications as in claim 6 further including means for reallocating first time slots in each cycle of the cyclical communications signal to allow a cell transceiver use of a first time slot dedicated to another cell transceiver in the same cluster area provided the reallocation does not result in simultaneous communication during the same firs time slot by adjacent cell transceivers.

12. The system for providing bidirectional telecommunications as in claim 6 wherein each cluster transceiver further includes:

means for regulating the broadcast power of cluster transceiver communications to diminish the likelihood that simultaneous cluster transceiver communications by different cluster transceivers in different group areas during the same second time sot will interfere with each other.

13. The system for providing bidirectional telecommunications as in claim 6 wherein the means for time division multiplexing communications between the cluster transceivers and the group transceivers across the service area comprises:

means for generating over the single communications channel a second cyclical communications signal;

means for dividing each communications cycle into the plurality of second time slots, each second time slot dedicated for communications by a certain assigned cluster transceiver in each group area thereby enabling each second time slot to be simultaneously used by multiple cluster transceivers in different group areas across the service area.

14. The system for providing bidirectional telecommunications as in claim 6 further including means for reallocating second time slots in each cycle of the cyclical communications signal to allow a cluster transceiver use of a second time slot dedicated to another cluster transceiver in the same group area provided the reallocation does not result in simultaneous communication during the same second time slot by adjacent cluster transceivers.

15. A system network for providing bi-directional burst telecommunications to a plurality of users in a service area wherein the service area is divided into a plurality of communications cells, each cell defining a cell area, comprising:

a plurality of user personal transceivers;

a cell transceiver communicating with user personal transceivers in its cell area;

a cluster transceiver for each one of a plurality of clusters of cells within the service area, each cluster of cells defining a cluster area, each cluster transceiver communicating with the cell transceivers in its cluster area;

a group transceiver for each one of a plurality of groups of clusters of cells within the service area, each group of clusters of cells defining a group area, each group transceiver communicating with the cluster transceivers in its group area; and means for time division multiplexing communications between the cell transceivers and each cluster transceiver and between the cluster transceivers and each group transceivers, the communications occurring on a single communications frequency, whereby multiple cell transceivers, each cell transceiver in a different cluster areas will simultaneously communicate with their associated cluster transceiver and multiple cluster transceivers, each cluster transceiver in a different group area, will simultaneously communicate with their associated group transceiver.

16. The system network for providing bidirectional burst telecommunications as in claim 15 wherein the means for time division multiplexing communications comprises:
   means for generating a cyclical communications signal on the single communications frequency;
   means for dividing each cycle of the first cyclical signal into the plurality of first and second time slots for communications, each first time slot dedicated to one cell transceiver per cluster and each second time slot dedicated to one cluster transceiver per group whereby multiple cell transceivers in different clusters simultaneously communicate with a cluster transceiver in the cluster area during the same first time slot and whereby multiple cluster transceivers in different groups simultaneously communicate with a group transceiver in the group area during the same second time slot.

17. The system network for providing bi-directional burst telecommunications as in claim 16 further including means for reallocating use of first and second time slots in each communications cycle to allow:
   a cell transceiver use of first time slot dedicated to another cell transceiver in the same cluster area provided the reallocation does not result in communication during the same time slot by adjacent cell transceivers in different cell areas; and
   a cluster transceiver use of a second time slot dedicated to another cluster transceiver in the same group area provided the reallocation does not result in simultaneous communication by adjacent cluster transceivers in different cluster areas.

18. The system network for providing bi-directional burst telecommunications as in claim 16 further comprising:
   means associated with each cell and cluster transceiver for regulating signal transmission power to minimize the likelihood of signal interference when multiple cell transceivers in different cluster areas and multiple cluster transceivers in different group areas simultaneously transmit communications during the same time slot.

19. The system network for providing bi-directional burst telecommunications as in claim 15 further including means for approximately locating users within the service area comprising:
   means for transmitting cell transceiver identification information from each cell transceiver in the service area, the identification information transmissions for each cell transceiver propagating beyond the cell area into other adjacent cell areas to define a broadcast area;
   means for storing a map of the service area including the broadcast areas for each cell transceiver;
   means for receiving the identification information transmissions of cell transceivers to identify cell transceivers proximate to the location of the user; and
   means for comparing the identified cell transceivers proximate to the user to the stored map of cells and intersecting broadcast areas to locate the user in a portion of a cell area defined by the intersection of the broadcast areas of each cell for which an identification broadcast of a proximate cell transceiver was received.

20. A system for providing bi-directional burst telecommunications within a service area, the service area divided into a plurality of communications cells, each cell defining a cell area, comprising:
   a cell transceiver for each cell;
   a cluster transceiver for each one of a plurality of clusters of cells within the service area, each cluster of cells defining a cluster area, each cluster transceiver communicating with the cell transceivers in its cluster area;
   a plurality of user personal transceivers, each personal transceiver communicating with the cell transceiver for the cell area where the user is located;
   means for time division multiplexing communications between the cell transceivers, personal transceivers and each cluster transceiver across the service area, all communications in the service area occurring on a single frequency using a cyclical communications signal, each cycle of the cyclical signal divided into a plurality of time slots, wherein each time slot is dedicated to one cell transceiver per cluster area for communications between the cell transceiver and its cluster transceiver and between the cell transceiver and each personal transceiver in its cell area;
   means for simultaneous communications by multiple cell transceivers in different cluster areas on the single frequency during the same time slot; and
   means for single frequency communications by each personal transceiver with the cell transceiver for the cell area where its user is located during the time slot dedicated to the cell transceiver where the user is located.

21. A system for providing bidirectional burst telecommunications within a service area, the service area divided into a plurality of communications cells, each cell defining a cell area, comprising:
   a cell transceiver for each cell;
   a cluster transceiver for each one of a plurality of clusters of cells within the service area, each cluster of cells defining a cluster area, each cluster transceiver communicating with the cell transceivers in its cluster area;
   means for time division multiplexing communications between the cell transceivers and each cluster transceiver across the service area, all communications in the service area occurring on a single frequency using a cyclical communications signal, each cycle of the cyclical signal divided into a plurality of time slots, wherein each time slot is dedicated to one cell transceiver per cluster area for communications between the cell transceiver and its cluster transceiver;
   means for simultaneous communications by multiple cell transceivers in different cluster areas on the single frequency during the same time slot; and
   means for reallocating time slots in each cycle of the cyclical communications signal to allow a cell transceiver use of a time slot dedicated to another cell transceiver in the same cluster area provided the reallocation does not result in simultaneous communication during the same time sot by adjacent cell transceivers.

22. A method for locating a communications user within a communications service area, comprising the steps of:

subdividing the service area into a plurality of cells, each cell defining a cell area;

transmitting communications between the plurality of cells over a single communications frequency;

time division multiplexing communications over the signal frequency into a plurality of cyclical time slots, each slot in a cycle dedicated for communications by multiple separated cells;

broadcasting a location communication from a transceiver in each cell over the single communications frequency during the time slot dedicated to the cell, the communication identifying the broadcasting cell and propagating beyond the area for the cell into adjacent cell areas to define a broadcast area;

storing a map of cells with broadcast areas for each cell across the service area;

receiving the broadcast location communications of cells to obtain the identification of cells proximate to the user;

comparing the identified proximate cells to the stored map of cells and cell broadcast areas; and locating the user in an area within a cell defined by the intersection of the broadcast areas for each cell identified through the received broadcast location communications.

* * * * *

UNITED STATES PATENT AND TRADEMARK OFFICE
CERTIFICATE OF CORRECTION

PATENT NO. : 5,233,643
DATED : August 3, 1993
INVENTOR(S) : Abdolreza S. Naeini, et al.

It is certified that error appears in the above-indentified patent and that said Letters Patent is hereby corrected as shown below:

Title page, item [54], and col. 2,
In the title, change "PERSONNEL" to --PERSONAL--.
Col. 6, line 50, change "bidi-rectional" to --bi-directional--.
Col. 8, line 19, change "ma" to --may--.
Col. 12, line 23, change "randomaccess" to --random access--.
Col. 16, line 10, after "service", insert --area--.
Col. 17, line 8, change "sot" to --slot--.
Col. 17, line 15, change "bidirectional" to --bi-directional--.
Col. 18, line 1, change "bidirectional" to --bi-directional--.
Col. 18, line 8, change "firs" to --first--.
Col. 18, line 9, change "bidirectional" to --bi-directional--.
Col. 18, line 16, change "sot" to --slot--.
Col. 18, line 18, change "bidirectional" to --bi-directional--.
Col. 18, line 32, change "bidirectional" to --bi-directional--.
Col. 18, line 47, after "transceiver", insert --for each cell, each cell transceiver--.
Col. 18, line 56, after "clusters", delete "of cells".
Col. 18, line 60, change "each" to --the--.
Col. 18, line 61, change "transceiver" to --tranceivers--.
Col. 18, line 62, change "each" to --the--.
Col. 18, line 65, change "areas" to --area--.

Signed and Sealed this

Twenty-sixth Day of September, 1995

Attest:

BRUCE LEHMAN

Attesting Officer    Commissioner of Patents and Trademarks